ered by the valve, so that the valve can be
UNITED STATES PATENT OFFICE.

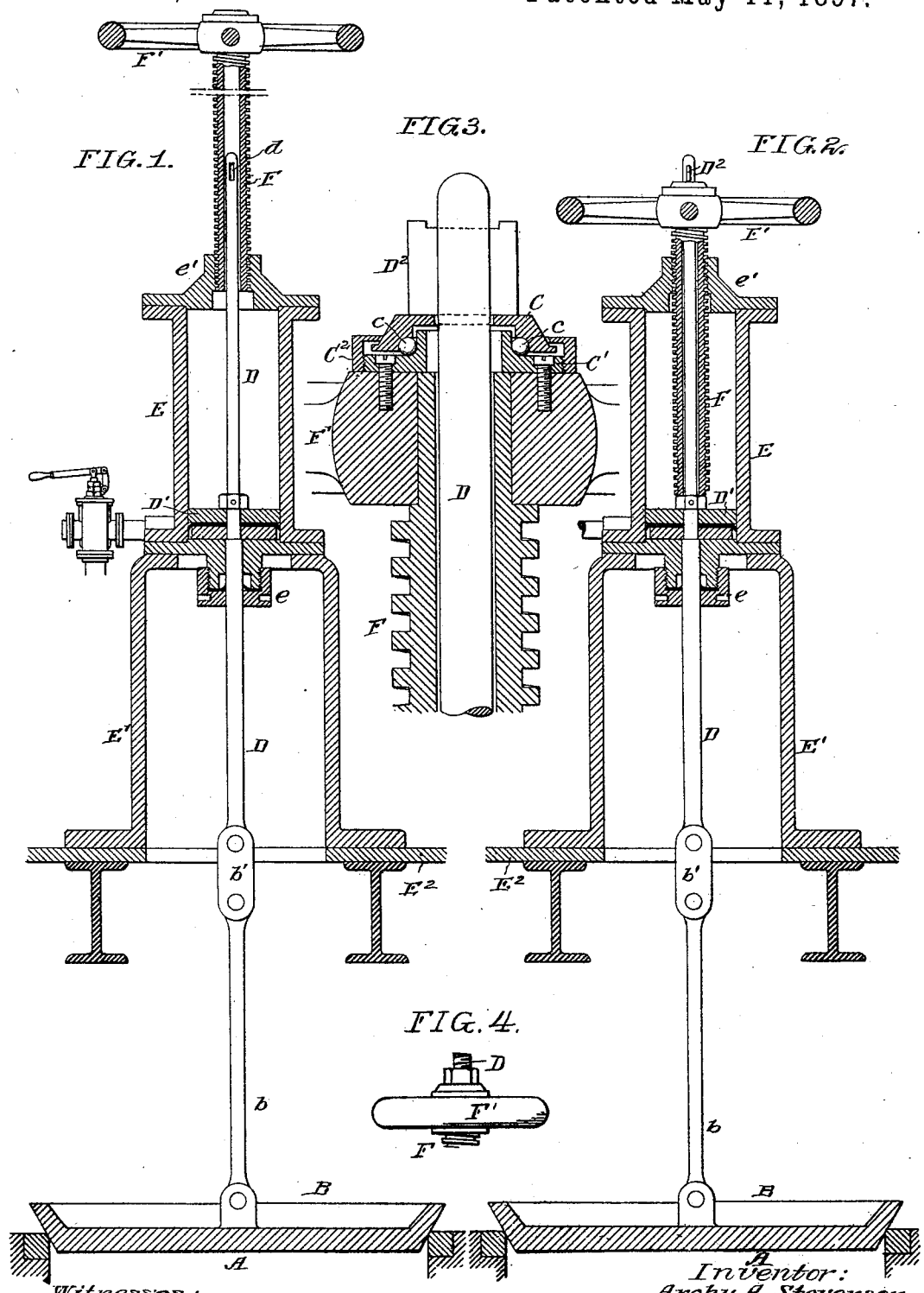

ARCHY A. STEVENSON, OF BURNHAM, PENNSYLVANIA.

HAND OPERATING MECHANISM FOR FLUID-OPERATED VALVES.

SPECIFICATION forming part of Letters Patent No. 582,557, dated May 11, 1897.

Application filed June 7, 1895. Serial No. 552,037. (No model.)

*To all whom it may concern:*

Be it known that I, ARCHY A. STEVENSON, a citizen of the United States, and a resident of Burnham, Mifflin county, Pennsylvania, have invented certain Improvements in Hand Operating Mechanism for Fluid-Operated Valves, of which the following is a specification.

The object of my invention is to so construct the mechanism of a fluid-operated valve that the valve can be operated by hand under certain conditions when the fluid-pressure is reduced or cut off.

While my invention is adapted for use in connection with fluid-operated valves in general, it is especially adapted for use in connection with the valves of metallurgical furnaces operated by compressed air.

Heretofore when the furnace was shut down, owing to a holiday, or for other causes, the air-compressor had to be run in order to shift the air and gas valves of the furnace at proper intervals, but by my invention the use of the compressor can be dispensed with except when the furnace is charged, as the gas and air valves can be operated by hand, as fully described hereinafter.

Referring to the accompanying drawings, Figure 1 is a vertical sectional view showing an air-inlet valve for a melting-furnace and the valve mechanism in section, the hand operating mechanism being disconnected. Fig. 2 is a view similar to Fig. 1, showing the hand operating mechanism connected. Fig. 3 is an enlarged sectional view showing a detail of my invention. Fig. 4 is a view of a modification.

A is the air-inlet opening of the furnace. B is the valve adapted to said opening and connected to the stem D by links $b$ and $b'$. The stem D is connected to a piston D', adapted to the cylinder E, mounted on the frame E', secured to the platform $E^2$. The head of the cylinder E has a suitable stuffing-box $e$, through which the stem D passes. The stem D extends a considerable distance above the pistons D' and works within a screw-spindle F, the thread of which is adapted to the threaded opening in the head $e'$ of the cylinder. This screw-spindle is provided with a hand-wheel F' or any suitable handle by which it can be turned.

In the end of the stem D is a keyway $b$, adapted to receive a key $D^2$, which rests on a loose disk or washer C, mounted on balls $c$, carried by a plate C', secured to the hand-wheel F'. A screw-ring $C^2$ extends over a flange on the washer C, so as to retain it in proper position, yet allow it to have free movement independent of the hand-wheel, so that when the key $D^2$ confines the stem D to the screw-spindle, as regards vertical movement, the hand-wheel and screw can turn freely around the stem.

In Fig. 1 I have shown a valve-stem disconnected from the screw-spindle, so that it can be elevated by air under pressure. The weight of the valve will bring it back to its seat when the air is exhausted, although in some instances the air-pipe may be connected to both ends of the cylinder when it is wished to close the valve against pressure.

In Fig. 2 the hand mechanism is shown connected to the valve-stem, the screw-spindle being turned down until it comes in contact with the nut above the piston and the slotted end of the stem projects beyond the screw, so that the key $D^2$ can be inserted in the slot, thus locking the stem to the screw-spindle. By this connection the valve can be elevated or closed by the screw and held in the closed position against pressure, and the valve can be adjusted and held in any position required.

By simply withdrawing the key and elevating the screw the valve mechanism can be readily detached from the spindle and hand-wheel.

It will be understood that in some instances a nut may be substituted for the key $D^2$, the end of the stem being threaded to receive the nut, as shown in Fig. 4.

I claim as my invention—

1. The combination of the valve, a seat therefor, a valve-stem having a piston adapted to a cylinder and a pipe communicating with that end of the cylinder adjacent to the valve, said pipe being in communication with a supply of motive fluid under pressure but independent of that whose flow is governed by the valve, so that the valve can be raised from its seat by fluid under pressure, the valve being returned to its seat by its own weight, when the motive fluid is exhausted from beneath the piston, with an independent hand-operated device provided with means for securing it to or detaching it from the valve-stem so that the valve can be opened by hand when the fluid is not available, substantially as described.

2. The combination of the valve, its stem, a piston on the stem, a cylinder, a screw-spindle through which the stem passes, a bearing for said screw-spindle, a handle for turning the spindle, a series of balls mounted on the spindle, a washer carried by the balls, a flanged ring secured to the spindle and overlapping the washer, means confined to the stem of the valve and resting upon the washer whereby the stem will move longitudinally with the screw-spindle so that the valve can be opened and closed by hand, substantially as described.

In testimony whereof I have signed my name to this specification in the presence of two subscribing witnesses.

ARCHY A. STEVENSON.

Witnesses:
R. T. HUGHES,
J. IRA MUSSER.